(12) United States Patent
Shiomi et al.

(10) Patent No.: US 8,401,759 B2
(45) Date of Patent: Mar. 19, 2013

(54) ACCELERATOR REACTION FORCE CONTROL APPARATUS

(75) Inventors: Masao Shiomi, Sagamihara (JP); Shigeyuki Sakaguchi, Yokohama (JP)

(73) Assignee: Nissan Motor Co., Ltd., Kanagawa (JP)

( * ) Notice: Subject to any disclaimer, the term of this patent is extended or adjusted under 35 U.S.C. 154(b) by 251 days.

(21) Appl. No.: 12/999,407

(22) PCT Filed: Jul. 29, 2009

(86) PCT No.: PCT/IB2009/006401
§ 371 (c)(1),
(2), (4) Date: Dec. 16, 2010

(87) PCT Pub. No.: WO2010/013125
PCT Pub. Date: Feb. 4, 2010

(65) Prior Publication Data
US 2011/0098900 A1    Apr. 28, 2011

(30) Foreign Application Priority Data

Jul. 29, 2008    (JP) ................................. 2008-194350
May 21, 2009    (JP) ................................. 2009-122998

(51) Int. Cl.
*G06F 7/70*     (2006.01)
(52) U.S. Cl. ............................... 701/70; 303/3; 180/170
(58) Field of Classification Search .............. 701/70, 701/93, 96, 78; 303/3; 180/170
See application file for complete search history.

(56) References Cited

U.S. PATENT DOCUMENTS

| | | | |
|---|---|---|---|
| 6,980,899 B2 * | 12/2005 | Minowa et al. | 701/70 |
| 7,243,010 B2 * | 7/2007 | Tabata et al. | 701/22 |
| 2001/0027368 A1 * | 10/2001 | Minowa et al. | 701/70 |
| 2003/0149521 A1 * | 8/2003 | Minowa et al. | 701/70 |
| 2004/0111510 A1 * | 6/2004 | Shoaib et al. | 709/224 |
| 2006/0006734 A1 * | 1/2006 | Tabata et al. | 303/3 |

FOREIGN PATENT DOCUMENTS

CN     1907750 A     2/2007

(Continued)

OTHER PUBLICATIONS

International Search Report from PCT/IB2009/006401 dated Dec. 8, 2009 (2 pages).
Notification Concerning Transmittal of International Preliminary Report on Patentability for International Application No. PCT/IB2009/006401 mailed Feb. 1, 2011 (5 pages).
Chinese Office Action issued in Chinese Application No. 200980129162.2, mailed on Dec. 13, 2012 (6 pages).

*Primary Examiner* — Thomas Black
*Assistant Examiner* — Shardul Patel
(74) *Attorney, Agent, or Firm* — Osha Liang LLP

(57) ABSTRACT

An apparatus to control a reaction force of an accelerator includes a detector to detect an opening degree of the accelerator, and a controller to increase the reaction force by a first force magnitude during a period in which the vehicle transitions from a first operational state to a second operational state in response to an increase in the opening degree of the accelerator, wherein the controller increases the reaction force if the accelerator opening degree is increased within a predetermined time period after the reaction force is increased by the first force magnitude, wherein the first operational state corresponds to a low specific fuel consumption and the second operational state corresponds to a high specific fuel consumption, and wherein the controller decreases the reaction force by the first force magnitude in response to a reduction in the opening degree of the accelerator.

20 Claims, 7 Drawing Sheets

FOREIGN PATENT DOCUMENTS

| | | |
|---|---|---|
| JP | 5-231194 A | 9/1993 |
| JP | 9-207604 A | 8/1997 |
| JP | 2004-192647 A | 7/2004 |
| JP | 2004-314871 A | 11/2004 |
| JP | 2005-132225 A | 5/2005 |
| JP | 2007-076468 A | 3/2007 |

* cited by examiner

ACCELERATOR REACTION FORCE CONTROL APPARATUS

CROSS-REFERENCE TO RELATED APPLICATIONS

The present application claims priority from Japanese Patent Application No. 2008-194350, filed Jul. 29, 2008 and Japanese Patent Application No. 2009-122998, filed May 21, 2009, the contents of which are both hereby incorporated by reference in their entirety.

BACKGROUND OF THE DISCLOSURE

1. Field of the Disclosure

The present disclosure relates to an accelerator-pedal reaction force control apparatus which controls a reaction force of an accelerator pedal of a vehicle, that is, a force necessary to depress the pedal (i.e., reaction force against the depression of the accelerator pedal).

2. Description of the Related Art

Japanese Unexamined Patent Application Publication No. 2005-132225 describes a technique for increasing a pedal reaction force of an accelerator pedal in a transition period in which an operational state with a low specific fuel consumption (high fuel efficiency) is changed to an operational state with a high specific fuel consumption (low fuel efficiency). An example of such a transition period is a period in which the state of a lock-up clutch is changed (switched) from an engaged state to a disengaged state in a vehicle including an automatic transmission. Thus, information regarding the change in the operational state to an operational state with low fuel efficiency can be presented to the driver, so that the driver can be suppressed from performing an accelerator operation which causes the change in the operational state to an operational state with low fuel efficiency. As a result, the fuel efficiency may be increased.

However, if the pedal reaction force is increased in the transition period in which the operational state is changed to the operational state with low fuel efficiency, such as the operational state in which the lock-up clutch is disengaged, the following may occur. That is, when, for example, the driver passes a vehicle in front while driving at a high speed, the accelerator opening degree is frequently increased and reduced in a relatively short period of time. In such a case, the accelerator pedal may be operated such that it is largely depressed, is returned, and is then depressed again. When the accelerator pedal is depressed the first time, the pedal reaction force is increased in the transition period in which the operational state is changed to the operational state with low fuel efficiency. Then, the increase in the pedal reaction force is eliminated when the accelerator pedal is returned. Then, the accelerator pedal is depressed again to increase the accelerator opening degree. At this time, if the driver is still under the influence of sensation of the temporal increase in the pedal reaction force in the previous transition period, the driver feels as if the accelerator pedal is lighter than usual. Therefore, the driver tends to depress the accelerator pedal by a larger amount than usual and unnecessarily increase the accelerator opening degree. In other words, it was found that there is a possibility that the increase in the pedal reaction force in the transition period for increasing the fuel efficiency will induce an excessive increase in the accelerator opening degree in the subsequent period. The excessive increase in the accelerator opening degree leads to sudden increase in a vehicle speed and an engine rotational speed, which cause reduction in the driving performance, exhaust performance, and fuel efficiency performance.

SUMMARY OF THE CLAIMED SUBJECT MATTER

In one aspect, the present disclosure relates to an apparatus to control a reaction force of an accelerator of a vehicle including a means for detecting an opening degree of the accelerator based on a magnitude at which the accelerator is operated, a first means for increasing the reaction force by a first force magnitude during a period in which the vehicle transitions from a first operational state to a second operational state in response to an increase in the opening degree of the accelerator, and a second means for increasing the reaction force, distinct from the first means for increasing the reaction force, if the accelerator opening degree is increased within a predetermined time period after the reaction force is increased by the first means, wherein the first operational state corresponds to a low specific fuel consumption and the second operational state corresponds to a specific fuel consumption higher than the low specific fuel consumption, and wherein the first means is configured to decrease the reaction force by the first force magnitude in response to a reduction in the opening degree of the accelerator.

In another aspect, the present disclosure relates to an apparatus to control a reaction force of an accelerator of a vehicle including a detector configured to detect an opening degree of the accelerator based on a magnitude at which the accelerator is operated and a controller configured to increase the reaction force by a first force magnitude during a period in which the vehicle transitions from a first operational state to a second operational state in response to an increase in the opening degree of the accelerator, wherein the controller is further configured to increase the reaction force if the accelerator opening degree is increased within a predetermined time period after the reaction force is increased by the first force magnitude, wherein the first operational state corresponds to a low specific fuel consumption and the second operational state corresponds to a high specific fuel consumption, and wherein the controller is further configured to decrease the reaction force by the first force magnitude in response to a reduction in the opening degree of the accelerator.

In another aspect, the present disclosure relates to a method to control a reaction force of an accelerator of a vehicle including detecting an opening degree of the accelerator based on a magnitude at which the accelerator is operated, increasing the reaction force by a first force magnitude during a period in which the vehicle transitions from a first operational state to a second operational state in response to an increase in the opening degree of the accelerator, decreasing the reaction force by the first force magnitude in response to a reduction in the opening degree of the accelerator, and increasing the reaction force if the accelerator opening degree is increased within a predetermined time period after the reaction force is increased by the first force magnitude, corresponding the first operational state to a low specific fuel consumption, corresponding the second operational state to a specific fuel consumption higher than the low specific fuel consumption, and decreasing the reaction force by the first force magnitude in response to a reduction in the opening degree of the accelerator.

BRIEF DESCRIPTION OF DRAWINGS

Features of the present disclosure will become more apparent from the following description in conjunction with the accompanying drawings.

DETAILED DESCRIPTION

Figure 1:
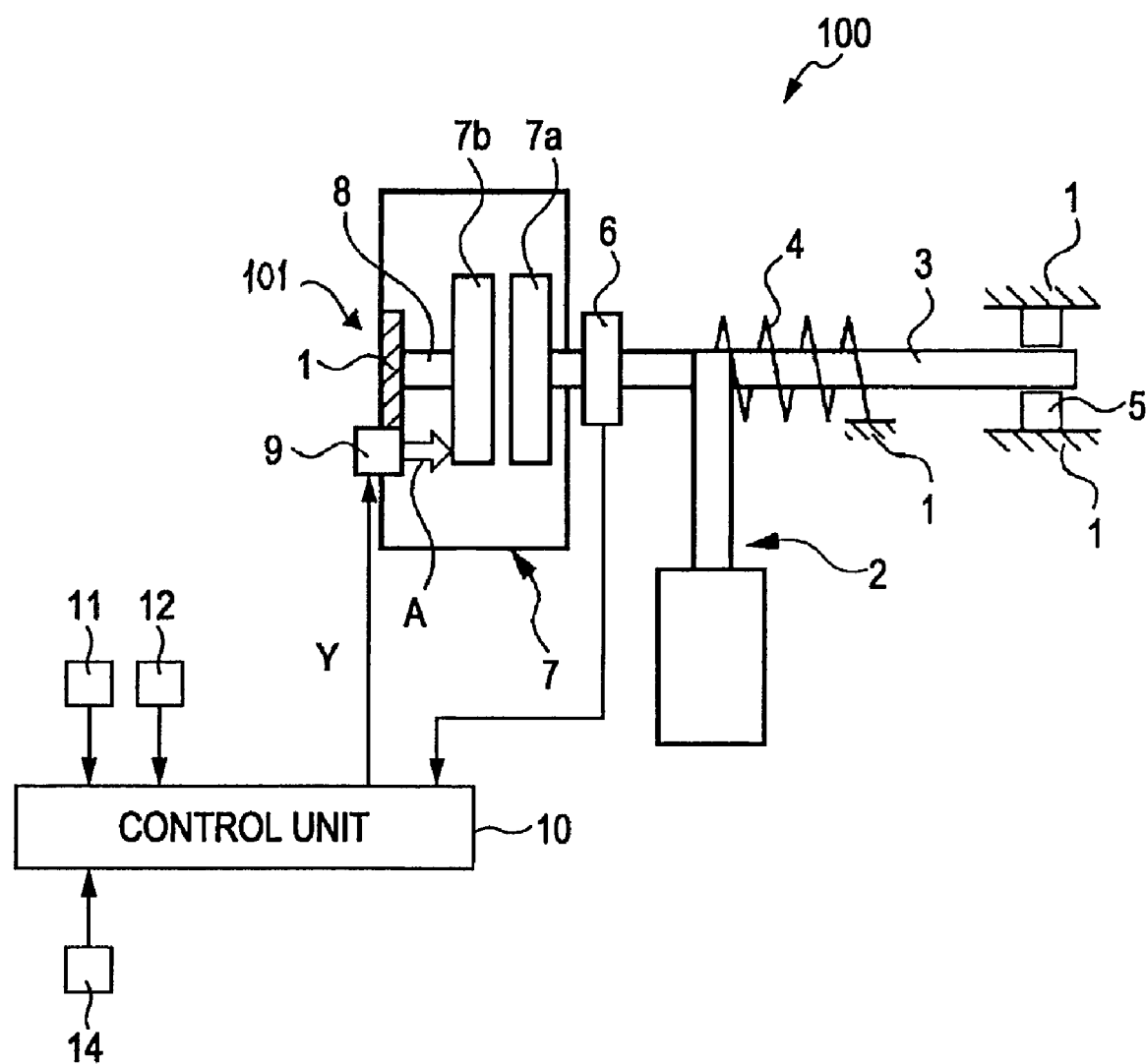
FIG. 1 is a system diagram illustrating an accelerator-pedal reaction force control apparatus according to an exemplary embodiment of the present disclosure.
Figure 2:
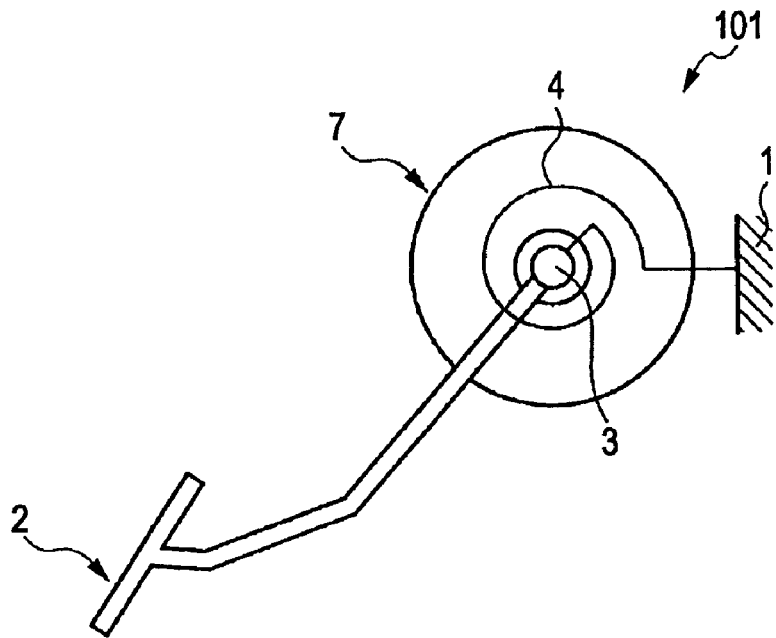
FIG. 2 is a schematic side view illustrating the structure of an accelerator-pedal reaction force changing mechanism according to an exemplary embodiment.

Exemplary embodiments of the present disclosure will be described in detail below with reference to the drawings. FIG. 1 is a system diagram illustrating an accelerator-pedal reaction force control apparatus 100 according to an exemplary embodiment of the present disclosure. FIG. 2 is a side view illustrating the structure of an accelerator-pedal reaction force changing mechanism 101. While the term "accelerator pedal" or "accelerator" is used throughout this specification, it should be understood that such terms should not be limited to any particular embodiment or style of input device. In particular, while a "pedal" inside the passenger compartment is described, it should be understood that the "accelerator" may be a device in the engine compartment responsive to electrical, hydraulic, or mechanical signals produced by a pedal (or other device) in the passenger compartment. Additionally, while the device in the passenger compartment is described as a pedal, it should be understood that various other regulating devices (e.g., levers, switches, buttons, etc) may be used as "accelerators" or as devices that signal an "accelerator." The accelerator-pedal reaction force control apparatus 100 may control the pedal reaction force of an accelerator pedal 2 provided on a body structure 1 of a vehicle. The accelerator pedal 2 may be provided on a rotating shaft 3, and may pivot about the rotating shaft 3. The accelerator pedal 2 may have a basic reaction force against the operation thereof from a return spring 4 attached to the rotating shaft 3. The reaction force applied by the return spring 4 may vary in proportion to an accelerator opening degree (APS), that is, a magnitude to which the accelerator pedal 2 may be actuated by a driver of the vehicle, in accordance with a spring constant of the return spring 4 (see cross-hatched area in FIG. 4A). As will be described in more detail below, the pedal reaction force of the accelerator pedal 2 may be selectively increased beyond the basic reaction force by the pedal-reaction-force changing mechanism 101. A pedal-reaction-force increasing area B, shown in FIG. 4A, corresponds to the amount of increase in the pedal reaction force added to the basic reaction force.

The rotating shaft 3 may be rotatably supported by a bearing 5 provided on the body structure 1 at one end thereof. An accelerator position sensor 6 may be provided near the other end of the rotating shaft 3. The accelerator position sensor 6 may detect the magnitude to which the accelerator pedal 2 is actuated by the driver of the vehicle (hereinafter simply referred to as an "accelerator opening degree") APS and may output a signal representing the accelerator opening degree APS. In addition, an engine rotational speed sensor 11, which may detect an engine rotational speed Ne, and a vehicle speed sensor 12, which may detect a vehicle speed VSP, may be provided as sensors for detecting the operational state of the vehicle.

In addition, the pedal-reaction-force changing mechanism 101, which is capable of actively changing (increasing) the reaction force of the accelerator pedal 2, may be provided. This mechanism may include a variable friction plate 7 which may include a pair of friction members 7a and 7b which apply a frictional force against the rotation of the rotating shaft 3. One friction member 7a may be mechanically fixed to an end portion of the rotating shaft 3. The other friction member 7b may be disposed so as to face the friction member 7a, and may be supported by a fixed shaft 8, which may be fixed to the body structure 1, with a spline or the like provided therebetween so that the friction member 7b may be movable in an axial direction but is not rotatable. An actuator (for example, an electromagnetic solenoid) 9 which may be capable of urging the friction member 7b against the friction member 7a may be fixed to the body structure 1.

The actuator 9 may operate to move the friction member 7b of the variable friction plate 7 in the axial direction (direction shown by the arrow A in FIG. 1), and thereby may increase or reduce the frictional force applied between the friction member 7a and the friction member 7b. The operation of the actuator 9 may be controlled by a control unit 10. Therefore, the control unit 10 may be capable of controlling the operation of the actuator 9 so as to change the frictional force applied to the rotating shaft 3. Accordingly, the pedal reaction force (depressing force) applied to the accelerator pedal 2 in accordance with the accelerator opening degree of the accelerator pedal 2 may be changed. More specifically, the amount of increase added to the basic reaction force may be changed. The control unit 10 may be a digital computer system having a function of storing and executing control processes. For example, as described below, the control unit 10 may execute a process of increasing the pedal reaction force on the basis of signals representing the operational state of the vehicle, such as a signal from the accelerator position sensor 6 which detects the accelerator opening degree APS, a signal from the engine rotational speed sensor 11 which detects the engine rotational speed Ne, and a signal from the vehicle speed sensor 12 which detects the vehicle speed VSP.

Figure 3:
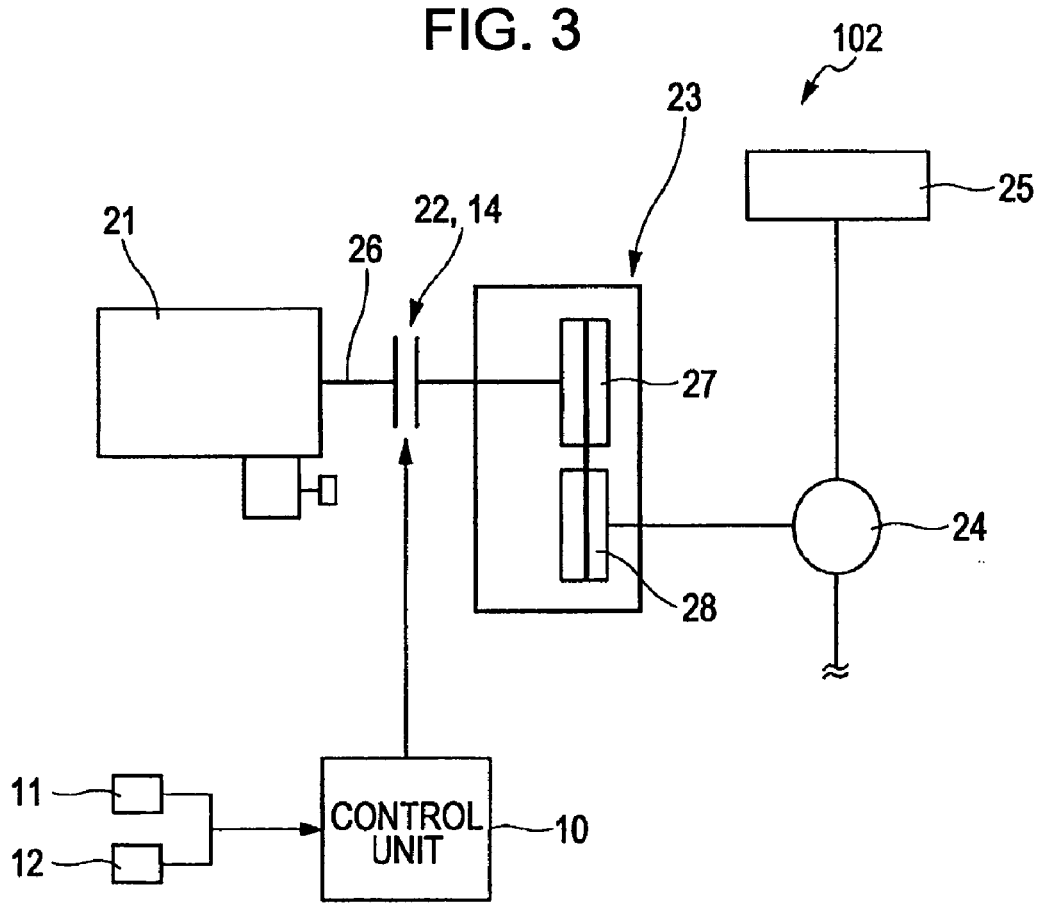
FIG. 3 is a schematic system diagram illustrating the structure of a vehicle in which the accelerator-pedal reaction force control apparatus according to an exemplary embodiment is installed.

FIG. 3 is a schematic system diagram illustrating the structure of a vehicle 102 in which the accelerator-pedal reaction force control apparatus according to the above-described exemplary embodiment may be installed. As shown in FIG. 3, a driving force may be generated by an internal combustion engine 21 in accordance with the operation of the accelerator pedal 2, and may be transmitted to a continuously variable transmission (CVT) 23, which may function as an automatic transmission, through a crank shaft 26 and a torque converter 22. The driving force transmitted to the CVT 23 may be transmitted to driving wheels 25 through a differential gear 24. The torque converter 22 may include a lock-up clutch 14 which engages or disengages a connection between an input and an output of the torque converter 22. The CVT 23 may include a primary pulley 27 at the input side and a secondary pulley 28 to which the rotation of the primary pulley 27 is transmitted by a belt (not shown). The CVT 23 may perform a speed-changing operation by changing the radial positions at which the belt stretched between the pulleys 27 and 28 is in contact with the pulleys 27 and 28 by changing the groove widths of the pulleys 27 and 28.

Figure 4A:
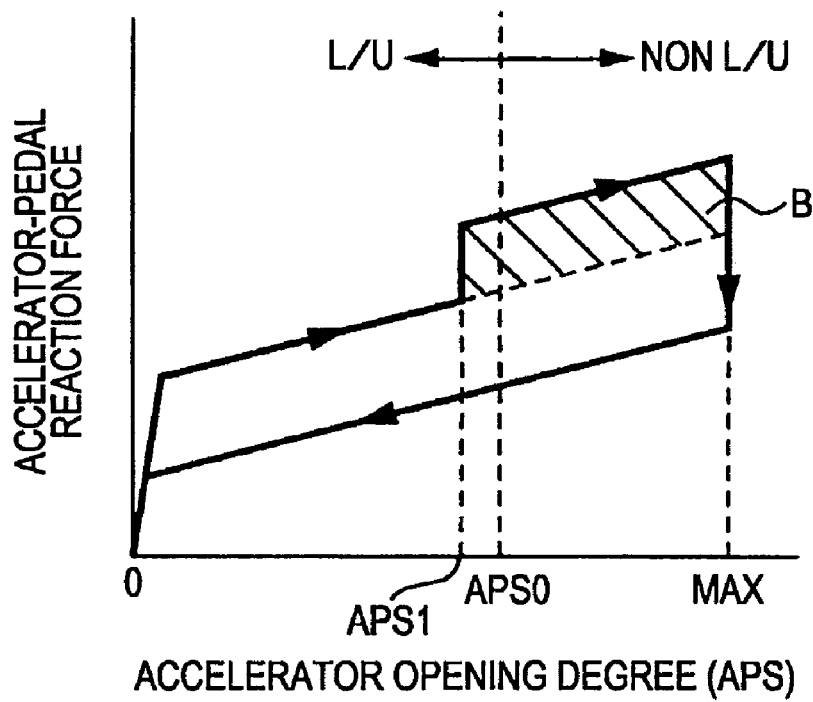
FIG. 4A is a graph illustrating the hysteresis characteristic between the accelerator opening degree and the accelerator pedal reaction force.
Figure 4B:
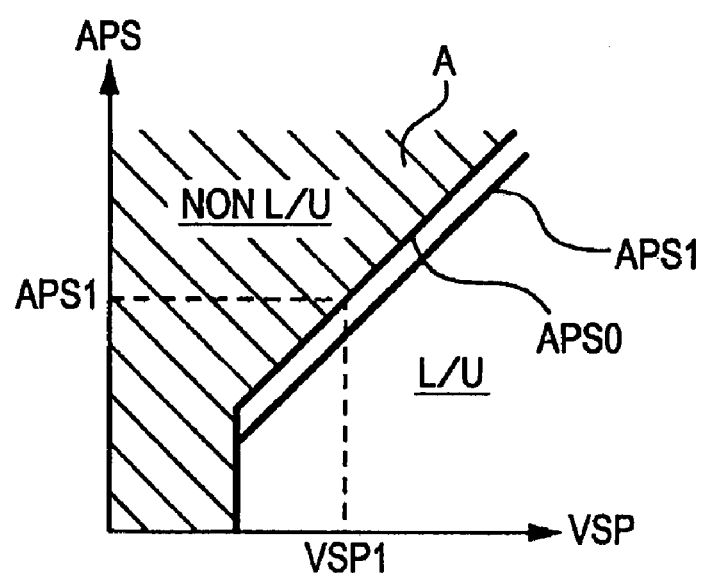
FIG. 4B is a graph showing the relationship between the vehicle speed and the accelerator opening degree in which areas corresponding to a disengaged lock-up (Non L/U) state and an engaged (L/U) state of a lock-up clutch are illustrated.

FIG. 4A is a graph illustrating the hysteresis characteristic between the accelerator opening degree APS and the pedal reaction force of the accelerator pedal 2. FIG. 4B is a graph showing the relationship between the vehicle speed VSP and the accelerator opening degree APS. FIG. 4B illustrates an area corresponding to a disengaged (Non L/U) state (shaded area A on the left of a line denoted by APS0 in FIG. 4B) of the lock-up clutch 14 and an area corresponding to an engaged (L/U) state of the lock-up clutch.

The lock-up clutch 14 may be switched between the engaged state and the disengaged state on the basis of the vehicle speed and the accelerator opening degree APS by referring to a control map shown in FIG. 4B. More specifically, when the accelerator opening degree APS is changed to a predetermined switching threshold APS0 while the lock-up clutch 14 is in the engaged (L/U) state, the state of the lock-up clutch 14 is switched to the disengaged (Non L/U) state. When the lock-up clutch 14 is in the disengaged state, the power transmission loss of the torque converter 22 is larger than that in the engaged state. Therefore, compared to the engaged state, the specific fuel consumption is high and the fuel efficiency is low.

According to the present exemplary embodiment, it may be determined whether or not the operational state is in the process of transitioning from the engaged state to the disengaged state, more broadly, from a first operational state with a low specific fuel consumption (engaged state) to a second operational state with a high specific fuel consumption (disengaged state). The determination may be performed by comparing the accelerator opening degree APS with a first determination threshold APS1. If it is determined that the operational state is in the transition period, the pedal reaction force (force required to depress the accelerator pedal) may be increased by a predetermined amount ΔF1 (denoted by B in FIG. 4A). More specifically, when the accelerator opening degree APS detected by the accelerator position sensor 6 is increased and exceeds the first determination threshold APS1 shown in the graph in FIG. 4B, the control unit 10 outputs a predetermined signal Y to the actuator 9 (see FIG. 1). The actuator 9 may be operated in response to the signal Y and the friction member 7b of the variable friction plate 7 may be pressed against the corresponding friction member 7a, so that the frictional force between the friction member 7a and the friction member 7b is increased. Thus, the pedal reaction force applied against the depression of the accelerator pedal 2 is increased.

Figure 6:
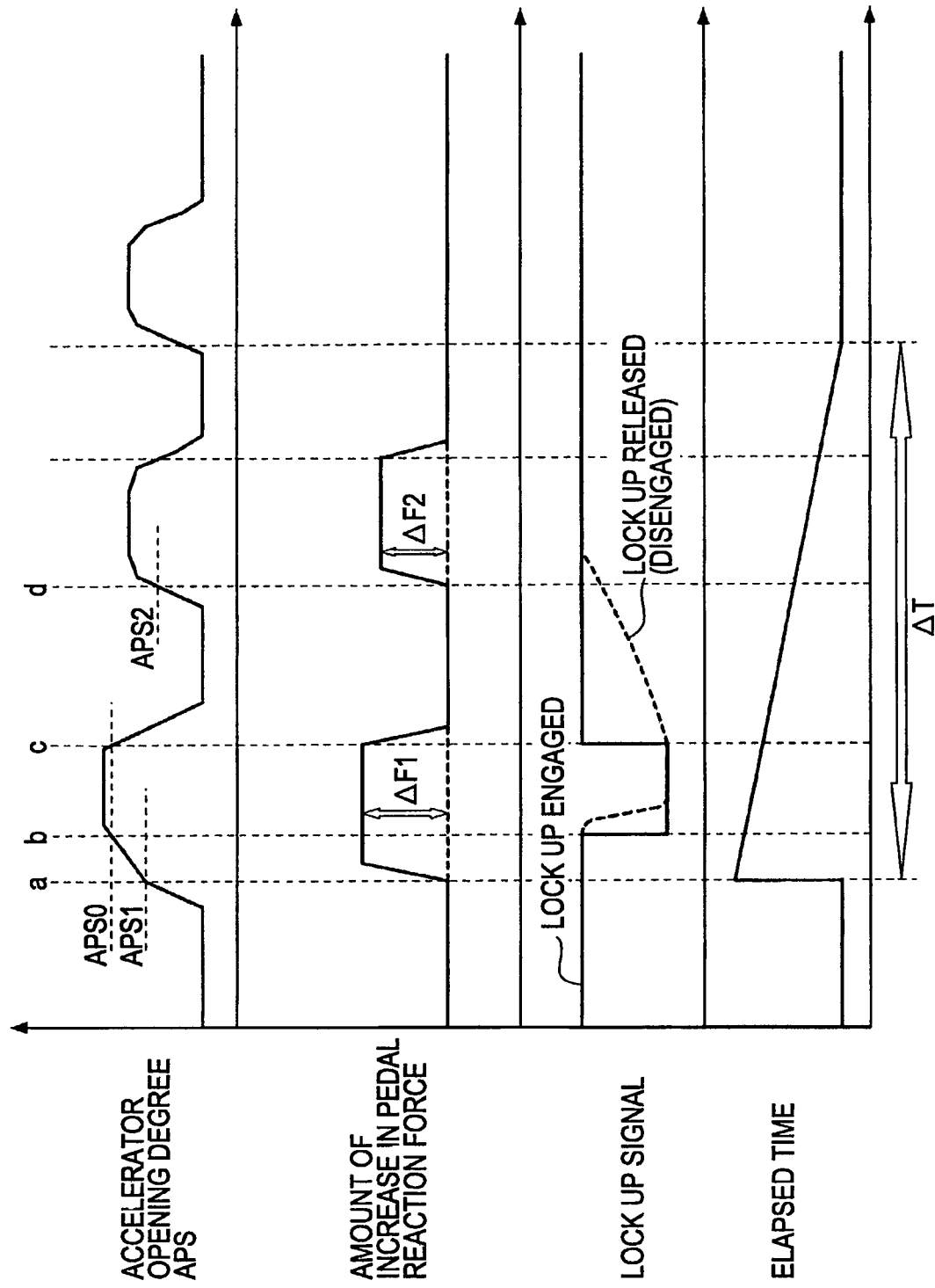
FIG. 6 is a timing chart showing the variation with time in the accelerator opening degree, the amount of increase in the pedal reaction force, etc., in a period including a transition period in which the state of the lock-up clutch is changed to the disengaged state according to an exemplary embodiment.

The first determination threshold APS1 may be set to a value which corresponds to a time immediately prior to the operational state changing to the second operational state with low fuel efficiency. More specifically, as shown in FIGS. 4B and 6, the first determination threshold APS1 may be set to a value slightly less than the switching threshold APS0 at which the operational state is switched to the second operational state with a low fuel efficiency. As shown in FIG. 4B, similar to the switching threshold APS0, the first determination threshold APS1 may also vary in accordance with the vehicle speed VSP and may be increased along with the switching threshold APS0 as the vehicle speed VSP increases. The amount of increase ΔF1 in the pedal reaction force may be set in accordance with the accelerator opening degree APS at the time when the pedal reaction force is increased, that is, in accordance with the first determination threshold APS1. More specifically, the reaction force achieved due to the increase ΔF1 is increased as the first determination threshold APS1 increases. Similarly, an amount of increase ΔF2, which will be described below, may also be set in accordance with the accelerator opening degree APS at the time when the reaction force is increased, that is, in accordance with a second determination threshold APS2.

If the accelerator opening degree (the amount of depression of the accelerator pedal 2) is reduced after the above-described increase in the pedal reaction force, it may become unnecessary to inform the driver that the operational state is being changed from the operational state with low fuel efficiency. Therefore, the increase in the pedal reaction force may be eliminated.

Figure 7:
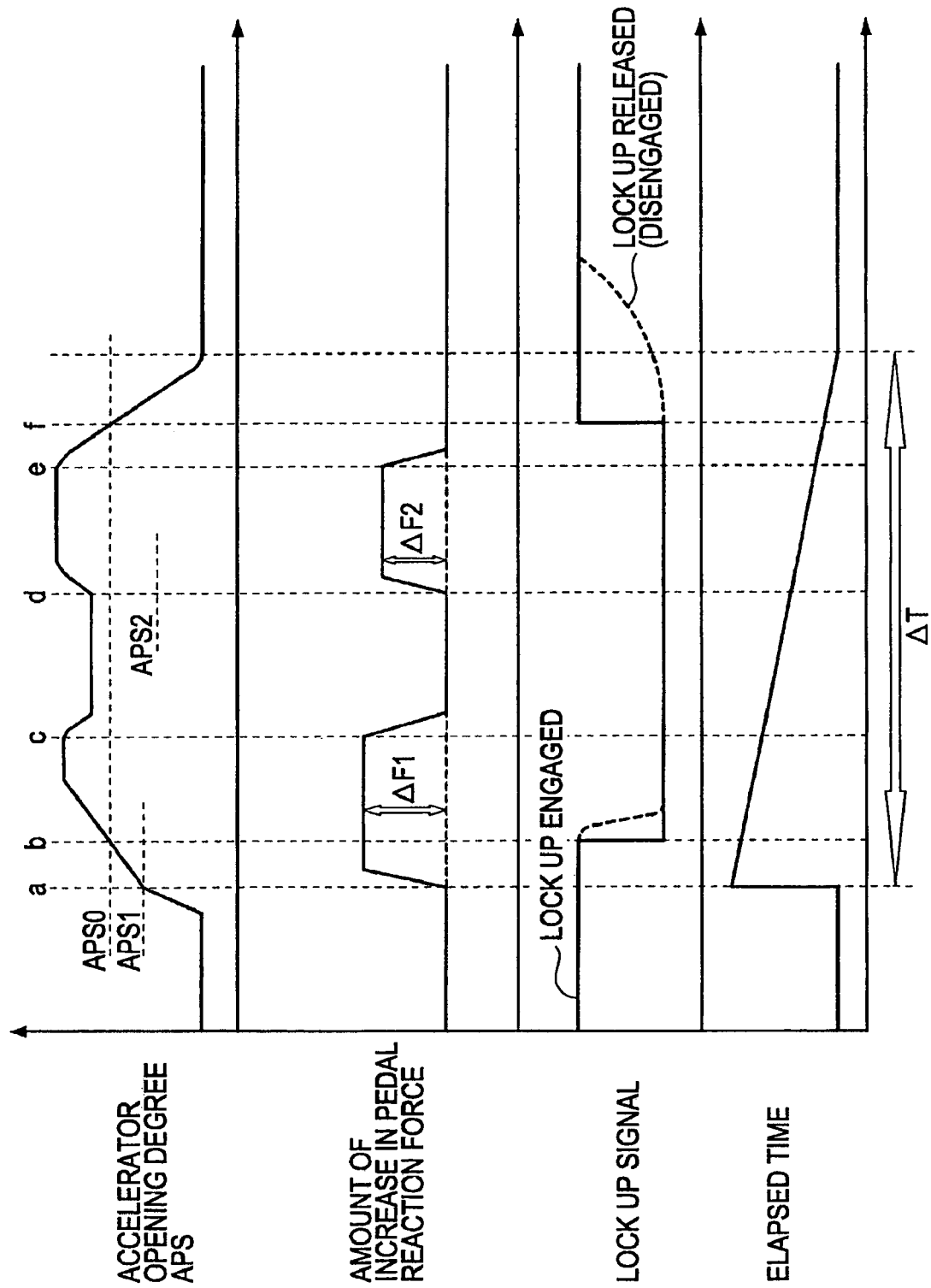
FIG. 7 is a timing chart showing the variation with time in the accelerator opening degree, the amount of increase in the pedal reaction force, etc., in a period including the transition period in which the state of the lock-up clutch is changed to the disengaged state according to another exemplary embodiment.

A control process of increasing the pedal reaction force during a transition period of the lock-up clutch 14 from the engaged state to the disengaged state will be described with reference to FIGS. 5 and 6. This control process is the main feature of the present exemplary embodiment. FIG. 7 is a timing chart according to another exemplary embodiment and will be explained below together with FIGS. 5 and 6.

Figure 5:
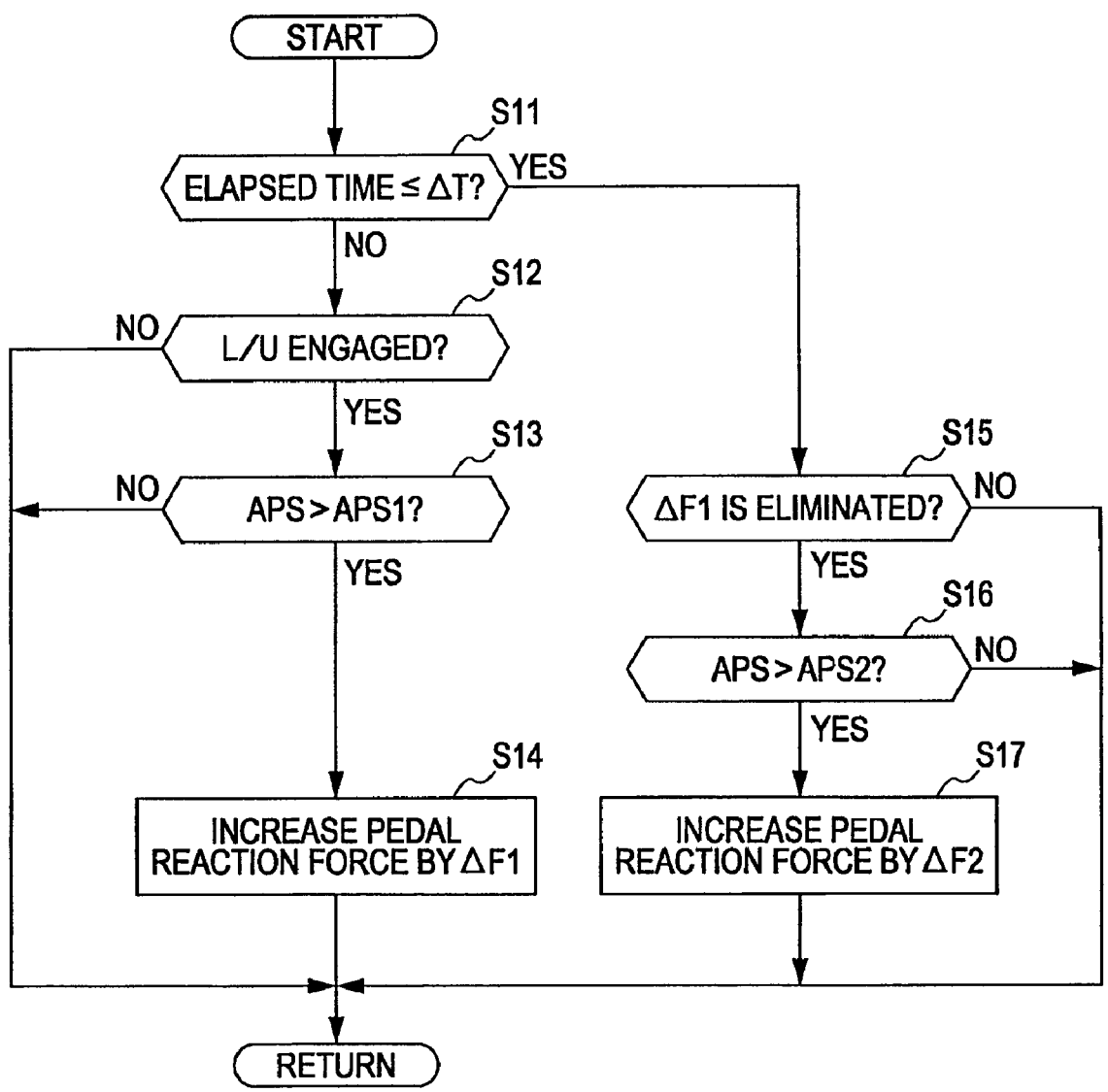
FIG. 5 is a flowchart of a control process of increasing the pedal reaction force according to an exemplary embodiment.

Referring to FIG. 5, in step S11, it is determined whether or not the time elapsed following the increase in the pedal-reaction-force (hereinafter also referred to as a first pedal-reaction-force increasing operation performed in step S14, which will be described below) is equal to or less than a predetermined time ΔT. More specifically, in the case where the pedal reaction force has already been increased in the transition period of the lock-up clutch 14 from the engaged state to the disengaged state, it is determined whether or not the time elapsed after the pedal-reaction-force increasing operation is equal to or less than the predetermined time ΔT. The predetermined time ΔT corresponds to the time period following the first reaction force increasing operation (ΔF1) during which the driver is likely to be accustomed to the reaction force achieved due to ΔF1. In the present exemplary embodiment, the predetermined time ΔT is set to a constant value of about several tens of seconds for simplicity. However, the reaction force that the driver is accustomed to varies depending on the accelerator opening degree (APS1) at the time when the pedal reaction force is increased by ΔF1 and the amount of increase ΔF1 in the accelerator opening degree. Therefore, preferably, the predetermined time ΔT may be changed in accordance with the accelerator opening degree (APS1) and the amount of increase ΔF1. Measurement of the elapsed time may begin when the driver is likely to noticeably sense increased accelerator resistance due to the increase in the pedal reaction force, that is, the time when the first pedal-reaction-force increasing operation is started (time a in FIG. 6 and time a in FIG. 7).

If it is determined that the elapsed time is longer than the predetermined time ΔT, or if the pedal-reaction-force increasing operation has not been performed since the start of the engine operation, the process proceeds to step S12, where it is determined whether or not the lock-up clutch 14 is in the engaged state. As shown in FIGS. 4A and 4B, the lock-up clutch 14 may be switched in accordance with the accelerator opening degree APS. More specifically, the state of the lock-up clutch 14 may be switched from the engaged state to the disengaged state when the accelerator opening degree APS exceeds the predetermined switching threshold APS0. The switching threshold APS0 is set in accordance with the vehicle speed, and is increased as the vehicle speed VSP increases, as shown in FIG. 4B. Therefore, the engagement state of the lock-up clutch 14 can be determined on the basis of the accelerator opening degree APS and the vehicle speed VSP.

Referring to FIG. 5 again, if the lock-up clutch 14 is in the engaged state, the process proceeds to step S13 from step S12. Then, in step S13, it is determined whether or not the lock-up clutch 14 is in the transition period in which the engaged state is changed to the disengaged state, that is, whether or not the condition for performing the first pedal-reaction-force increasing operation is satisfied. To be more specific, it is determined whether or not the accelerator opening degree APS is being increased and is larger than the first determination threshold APS1. If the accelerator opening degree APS is larger than the first determination threshold APS1, the process proceeds from step S13 to step S14, where the pedal reaction force is increased by the predetermined amount ΔF1 (at time a in FIG. 6 and time a in FIG. 7). More specifically, the pedal reaction force may be increased by the pedal-reaction-force changing mechanism, so that the force required to depress the accelerator pedal 2 is increased. Then, if the accelerator opening degree APS (the amount of depression of the accelerator pedal) is reduced after the first pedal-reaction-force increasing operation, the increase in the pedal reaction force may be immediately eliminated. The increase in the pedal reaction force may also be eliminated after the accelerator opening degree APS is reduced to a predetermined elimination threshold.

If it is determined in step S11 that the elapsed time is less than the predetermined time ΔT, the process proceeds to step S15, where it is determined whether or not a condition for performing a second pedal-reaction-force increasing operation, in which the pedal reaction force may temporarily be increased again after the first pedal-reaction-force increasing operation, is satisfied. More specifically, in step S15, it is determined whether or not the increase in the pedal reaction force provided by the first pedal-reaction-force increasing operation is already eliminated. Thus, the pedal reaction force may be prevented from being further increased in a case where it has already been increased. Then, in step S16, it is determined whether or not the accelerator opening degree APS is larger than the second determination threshold APS2. The second determination threshold APS2 is set to be smaller than the first determination threshold APS1, so that subsequent excessive depression of the accelerator pedal due to the driver still being accustomed to the reaction force of the first pedal-reaction-force increasing operation may be suppressed in an early stage.

If the results of the determinations performed in steps S15 and S16 are both YES, the process proceeds to step S17, where the pedal reaction force may be increased by the predetermined amount of increase ΔF2 (at time d in FIG. 6 and time d in FIG. 7). More specifically, the pedal reaction force may be increased by the pedal-reaction-force changing mechanism, so that the force required to depress the accelerator pedal 2 is increased. In the present exemplary embodiment, the amount of increase in the pedal reaction force may be set in accordance with the accelerator opening degree APS. Therefore, the amount of increase ΔF2 used after the transition period is smaller than the amount of increase ΔF1 used in the transition period.

In the above-described exemplary embodiment, the first determination threshold APS1, at which the pedal reaction force is increased in the transition period, may be set to a value smaller than the switching threshold APS0, at which the state of the lock-up clutch 14 is changed from the engaged state to the disengaged state, by a predetermined amount. Alternatively, however, the first determination threshold APS1 may be set to the switching threshold APS0, and the pedal reaction force may also be increased at the time when the accelerator opening degree APS reaches the switching threshold APS0.

In addition, in the above-described exemplary embodiment, measurement of the elapsed time used in step S11 may begin with initiation of the pedal-reaction-force increasing operation (time a in FIGS. 6 and 7). However, measurement of the elapsed time may also begin once the pedal-reaction-force increasing operation ends (time c in FIGS. 6 and 7), when the lock-up clutch 14 is disengaged (time b in FIGS. 6 and 7), or at an intermediate time between the time a and the time c, such as a predetermined time period following time a.

According to the above-described control process of the present exemplary embodiment and as shown in the timing chart of FIG. 6, when the accelerator opening degree APS is increased and reaches the first determination threshold APS1 (at time a), it may be determined that the operational state of the lock-up clutch 14 is transitioning from the engaged state to the disengaged state. Therefore, the reaction force may be increased. Then, when the accelerator opening degree is further increased and reaches the switching threshold APS0 (at time b), the state of the lock-up clutch 14 may switch from the engaged state to the disengaged state. As shown by the dashed line in FIG. 6, the actual state of the lock-up clutch 14 may change with a time delay relative to the command shown by the solid line.

Then, when the accelerator opening degree APS is reduced, the increase in the pedal reaction force provided in the transition period is immediately eliminated. Then, when the accelerator opening degree APS becomes less than the switching threshold APS0 (at time c), the state of the lock-up clutch 14 changes from the disengaged state to the engaged state. The actual state of the lock-up clutch 14 may change with a time delay, which is larger than that in the process of switching to the disengaged state, as shown by the dashed line.

Then, if the accelerator opening degree APS is increased and reaches the second determination threshold APS2 (at time d) before the predetermined time ΔT elapses following the pedal-reaction-force increasing operation, the reaction force may be increased again. At this time, in the example shown in FIG. 6, the lock-up clutch 14 is in a slipping state, that is, a so-called half-clutch state, between the engaged state and the disengaged state.

In another exemplary embodiment shown in FIG. 7, when the accelerator opening degree APS is increased and reaches the first determination threshold APS1 (at time a), it may be determined that the lock-up clutch 14 is transitioning from the engaged state to the disengaged state. Therefore, the reaction force may be increased. Then, when the accelerator opening degree is further increased and reaches the switching threshold APS0 (at time b), the state of the lock-up clutch 14 may switch from the engaged state to the disengaged state. The actual state of the lock-up clutch 14 may change to the disengaged state with a certain time delay, as shown by the dashed line.

Then, when the accelerator opening degree APS is reduced (at time c), the increase in the pedal reaction force provided in the transition period may be eliminated. In this example, the disengaged state of the lock-up clutch 14 may be maintained because the accelerator opening degree APS is not smaller than the switching threshold APS0.

Then, if the accelerator opening degree APS is increased (at time d) before the predetermined time ΔT elapses following the pedal-reaction-force increasing operation, the pedal reaction force may be increased by the predetermined amount ΔF2. In the present exemplary embodiment, to more reliably suppress the excessive depression of the accelerator pedal due to the driver still being accustomed to the reaction force associated with the pedal-reaction-force increasing operation, the pedal reaction force may be increased again in the following manner. That is, the pedal reaction force may be increased again if both the accelerator opening degree APS is larger than the second determination threshold APS2 and the first pedal reaction force has been eliminated. In other words, the pedal reaction force may be increased again if the driver subsequently depresses the accelerator pedal 2 and the accelerator opening degree APS increases while the accelerator opening degree APS is larger than the second determination threshold APS2.

Then, when the accelerator opening degree APS is reduced (at time e), the increase in the pedal reaction force (ΔF2) provided after the transition period may be eliminated. Then, when the accelerator opening degree APS is reduced and becomes less than the switching threshold APS0 (at time f), the state of the lock-up clutch 14 may change to the engaged state.

The characteristic structure and operational effects of the present disclosure will be described with reference to the above exemplary embodiments. The structure of the present disclosure may include pedal-reaction-force changing means which may include the variable friction plate 7, the actuator 9, etc., for intentionally and temporarily changing the pedal reaction force of the accelerator pedal 2 and accelerator-opening-degree detecting means which may include the accelerator position sensor 6 or the like for detecting the accelerator opening degree APS of the accelerator pedal 2. The control unit 10 may control the process of changing (e.g., increasing) the pedal reaction force. If the accelerator opening degree APS is increased and it is detected that the operational state of the vehicle is in a predetermined transition period in which the operational state is changed from the first operational state with a low specific fuel consumption to the second operational state with a high specific fuel consumption, the pedal reaction force may be increased (via first pedal-reaction-force increasing means, at step S14). The increase in the pedal reaction force may be eliminated in accordance with, for example, a reduction in the accelerator opening degree. If the accelerator opening degree APS is increased again within a predetermined time period ΔT after the pedal-reaction-force increasing operation in the transition period, the pedal reaction force may be increased again (via second pedal-reaction-force increasing means, at step S17).

Thus, the pedal reaction force may be temporarily and intentionally increased in the transition period in which the operational state is changed to the second operational state with a high specific fuel consumption (low fuel efficiency), so that the driver may be likely to noticeably sense increased accelerator resistance and recognizes that the operational state is being changed to the second operational state with a low fuel efficiency. As a result, the transition to the operational state with low fuel efficiency may be suppressed. In addition, if the accelerator opening degree APS is increased again within the predetermined time period ΔT after the pedal-reaction-force increasing operation in the transition period, the pedal reaction force may be temporarily and intentionally increased again. Thus, the increase in the pedal reaction force may be repeated, so that the excessive depression of the accelerator pedal, that is, the excessive increase in the accelerator opening degree, due to the driver being accustomed to the reaction force associated with the pedal-reaction-force increasing operation may be suppressed. As a result, the reduction in the driving performance, exhaust performance, fuel efficiency performance, etc., caused by the excessive increase in the accelerator opening degree may be effectively suppressed and prevented.

In the case where the pedal reaction force is increased while the lock-up clutch 14 is transitioning from the engaged state to the disengaged state, there is a possibility that the accelerator pedal 2 will be excessively depressed due to the influence of the increase in the pedal reaction force in the transition period. In such a case, when, in particular, the lock-up clutch 14 is in the disengaged state, excessive increase in the engine rotational speed easily occurs. However, because the second pedal-reaction-force increasing operation is performed after the transition period as described above, the excessive increase in the engine rotational speed due to the excessive depression of the accelerator pedal may be prevented.

When the accelerator opening degree APS exceeds the switching threshold APS0, the operational state may change from the first operational state to the second operational state. In the case where the pedal reaction force is increased when the accelerator opening degree APS exceeds the first determination threshold APS1, the first determination threshold APS1 used in the operation of temporarily increasing the pedal reaction force in the transition period may be set to a value that is slightly smaller than the switching threshold APS0.

Accordingly, as shown in FIG. 6, in the transition period, the pedal reaction force may be increased when the accelerator opening degree APS is increased and reaches the first determination threshold APS1 before reaching the switching threshold APS0. In other words, the pedal reaction force may be temporarily increased immediately before the operational state actually changes to the second operational state with low fuel efficiency. Thus, the information regarding such a situation may be presented to the user. Therefore, the frequency at which the operational state may be changed to the second operational state with low fuel efficiency may be further reduced.

The pedal-reaction-force increasing operation in the transition period may be performed when the accelerator opening degree APS exceeds the first determination threshold APS1, and the pedal-reaction-force increasing operation after the transition period may be performed when the accelerator opening degree APS exceeds the second determination threshold APS2. In such a case, as shown in FIG. 6, the second determination threshold APS2 may be set to a value smaller than the first determination threshold APS1. If the determination threshold APS2 of the accelerator opening degree for increasing the pedal reaction force is gradually reduced in the predetermined time period ΔT, as described above, the increase in the accelerator opening degree (amount of depression) caused by the driver may be effectively reduced or suppressed. Therefore, the frequency at which the operational state may be changed to the second operational state with low fuel efficiency (disengaged state of the lock-up clutch) may be reduced. In addition, in the pedal-reaction-force increasing operations performed after the transition period, that is, in the second and the following pedal-reaction-force increasing operations, the excessive depression of the accelerator pedal due to the driver being accustomed to the reaction force associated with the previous pedal-reaction-force increasing operation may be suppressed while the accelerator opening degree APS is relatively small. After the transition period in which the state of the lock-up clutch is changed to the disengaged state, there is a high possibility that the lock-up clutch may be in the disengaged state (see FIG. 7) for a while or in a slipping state (see FIG. 6). At this time, excessive increases in the engine rotational speed due to excessive depression of the accelerator pedal may easily occur. However, this may be reliably prevented by performing the second and the following pedal-reaction-force increasing operations for suppressing the excessive depression of the accelerator pedal while the accelerator opening degree APS is relatively small.

The amount of increase ΔF2 used in the second pedal-reaction-force increasing operation after the transition period may be set to be smaller than the amount of increase ΔF1 used in the first pedal-reaction-force increasing operation in the transition period. The amount ΔF1 by which the pedal reaction force may be increased in the transition period may be set to be relatively large in order to prioritize the suppression of the change in the operational state to the second operational state with low fuel efficiency. In addition, the amount of increase in the pedal reaction force may be preferably set in proportion to the accelerator opening degree at the time when the pedal reaction force is increased (at the determination threshold APS1 or APS2 of the pedal reaction force) so that the amount of increase may be prevented from being excessively large or small with respect to the accelerator opening degree.

When a long time elapses after the pedal-reaction-force increasing operation in the transition period occurs, the likelihood of the driver remaining accustomed to the reaction force associated with the reaction force increasing operation decreases. If the reaction force is temporarily increased in such a situation, the repeatability of the increase in the pedal reaction force may be reduced and there may be a risk that the driver will recognize that the increase in the reaction force is due to the pedal-reaction-force increasing operation in the transition period. Therefore, preferably, the pedal-reaction-force increasing operation after the transition period (step S17) may be prohibited if the time elapsed after the pedal-reaction-force increasing operation in the transition period reaches the predetermined time ΔT (step S11 in FIG. 5). Although exemplary embodiments of the present disclosure have been described with reference to the accompanying drawings, the present disclosure is not limited to the structures of the embodiments, including those denoted by reference numerals in the drawings, and various modifications are possible.

For example, in the above-described embodiments, the transition period in which the state of the lock-up clutch is changed from the engaged state to the disengaged state is described as an example of the transition period in which the operational state is changed to an operational state with a low fuel efficiency performance. However, in the case where, for example, the vehicle includes an internal combustion engine which increases the fuel consumption for reducing the exhaust temperature, the control process according to the present disclosure may also be applied to a transition period in which the operational state is changed from a fuel-consumption non-increasing range in which the fuel consumption may not be increased to a fuel-consumption increasing range in which the fuel consumption is increased. Alternatively, the control process according to the present disclosure may also be applied to the transition period in which the operational state may be changed to a high-rotational-speed, high-load operating range in which the fuel efficiency is low.

Figure 8:
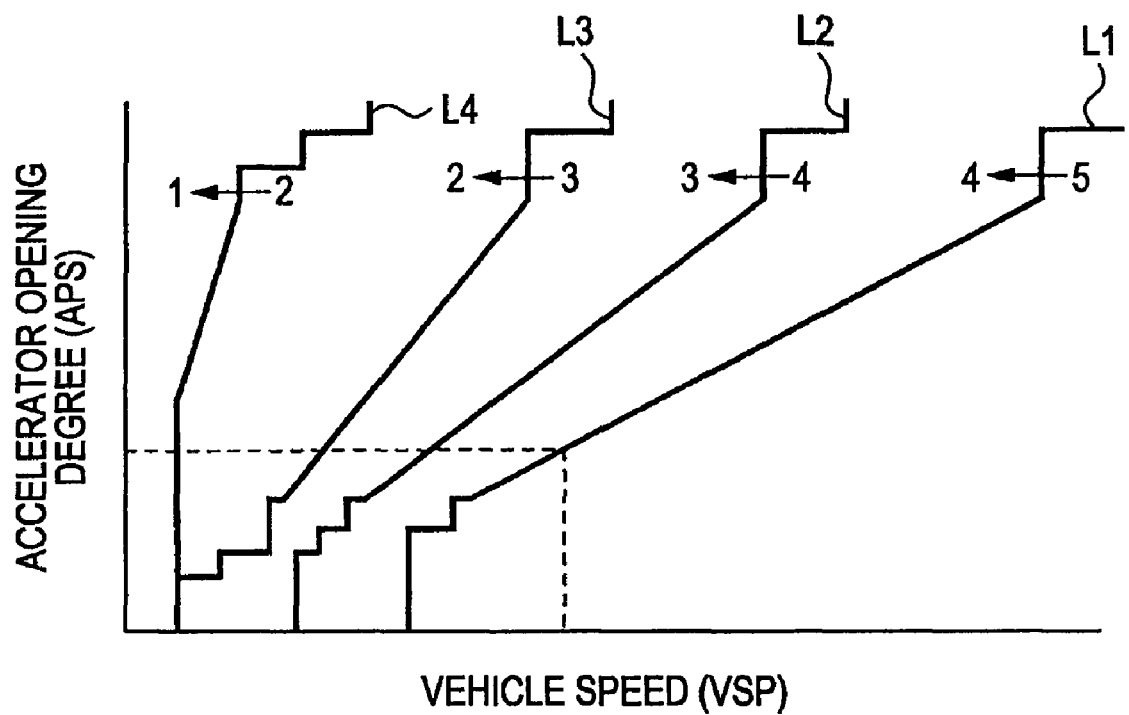
FIG. 8 is a characteristic diagram illustrating speed-changing operations performed by a 5-speed automatic transmission.

In addition, in the case where the vehicle includes a multi-speed automatic transmission, the control process according to the present disclosure is preferably applied to a transition period in which a high speed range may be shifted to a low speed range, at which the fuel efficiency is low. For example, FIG. 8 is a graph illustrating down-shifting operations performed by a 5-speed automatic transmission. As shown in FIG. 8, speed-changing curves L1 to L4 for the down-shifting operations are set in accordance with the vehicle speed VSP and the accelerator opening degree APS. When, for example, the accelerator opening degree APS is increased so as to cross the speed-changing curve L1 from the fifth speed side to the fourth speed side, the speed range is shifted from the fifth speed to the fourth speed. The first determination threshold APS1 may be set in accordance with the speed-changing curves L1 to L4 so that the pedal reaction force may be temporarily increased, similar to the above-described exemplary embodiments, in the transition period in which a high speed range may be shifted to a low speed range, at which the fuel efficiency is low. Also when a continuously variable transmission is used as in the above-described embodiments, the control process according to the present disclosure may be applied to a transition period in which a high speed range may be shifted to a low speed range, at which the fuel efficiency is low, by the transmission. In addition, if, for example, the driver removes his or her foot from the accelerator pedal 2 after the pedal-reaction-force increasing operation in the transition period, the likelihood of the driver remaining accustomed to the reaction force associated with the previous pedal-reaction-force increasing operation decreases. Therefore, when, for example, an idle switch SW is used and the idle switch SW detects that the accelerator opening degree APS is reduced to 0, the second pedal-reaction-force increasing operation may be prohibited.

Embodiments disclosed herein may advantageously include an accelerator-pedal reaction force control apparatus having an accelerator-opening-degree detecting unit to detect an accelerator opening degree which changes when an accelerator pedal of a vehicle is operated, a reaction-force changing unit for changing a pedal reaction force of the accelerator pedal, and a controller which controls the pedal reaction force using the reaction-force changing unit.

Advantageously, the pedal reaction force may be increased in a transition period in which an operational state of the vehicle is changed from a first operational state with a low specific fuel consumption to a second operational state with a high specific fuel consumption may be increased in accordance with an increase in the accelerator opening degree, and then the increase in the pedal reaction force may be eliminated in accordance with a reduction in the accelerator opening degree (first pedal-reaction-force increasing unit). Next, the pedal reaction force may be increased again in response to an increase in the accelerator opening degree within a predetermined time period after the increase in the pedal reaction force in the transition period (second pedal-reaction-force increasing unit).

Advantageously, if it is detected that the operational state is in a predetermined transition period in which the operational state is changed to the second operational state with a low fuel efficiency in accordance with the increase in the accelerator opening degree, the driver may be informed that the operational state is being changed to the second operational state with a low fuel efficiency. More specifically, the pedal reaction force may be increased so as to suppress or prevent the change in the operational state to the second operational state with low fuel efficiency. In addition, for a predetermined time period after the increase in the pedal reaction force in the transition period, the pedal reaction force may be increased again in response to an increase in the accelerator opening degree so as to suppress the excessive increase in the accelerator opening degree due to the influence of the sensation of the increase in the pedal reaction force in the transition period.

Advantageously, the pedal reaction force may be increased in a predetermined transition period in which the operational state is changed from the first operational state with a low specific fuel consumption (high fuel efficiency) to the second operational state with a high specific fuel consumption (low fuel efficiency) in accordance with an increase in the accelerator opening degree. Therefore, the frequency and probability of occurrence of the change in the operational state to the second operational state can be effectively reduced. In addition, for a predetermined time period after the increase in the pedal reaction force in the transition period, the pedal reaction force may be increased again in response to an increase in the accelerator opening degree. Therefore, the excessive depression of the accelerator pedal by the driver due to the influence of the sensation of the increase in the pedal reaction force in the transition period may be suppressed.

While the disclosure has been presented with respect to a limited number of exemplary embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. An apparatus to control a reaction force of an accelerator of a vehicle, the control apparatus comprising:
   a means for detecting an opening degree of the accelerator based on a magnitude at which the accelerator is operated;
   a first means for increasing the reaction force by a first force magnitude during a period in which the vehicle transitions from a first operational state to a second operational state in response to an increase in the opening degree of the accelerator; and
   a second means for increasing the reaction force, distinct the first means for increasing the reaction force, if the accelerator opening degree is increased within a predetermined time period after the reaction force is increased by the first means;
   wherein the first operational state corresponds to a low specific fuel consumption and the second operational state corresponds to a specific fuel consumption higher than the low specific fuel consumption, and wherein the first means is configured to decrease the reaction force by the first force magnitude in response to a reduction in the opening degree of the accelerator.

2. The apparatus of claim 1, wherein, the second means increases the reaction force when the opening degree of the accelerator is increased after the first means decreases the reaction force by the first force magnitude.

3. The apparatus of claim 1, wherein: the first means increases the reaction force when the opening degree of the accelerator exceeds a first determination threshold set in accordance with the transition period; the second means increases the reaction force when the opening degree of the accelerator exceeds a second determination threshold; and wherein the second determination threshold is smaller than the first determination threshold.

4. The apparatus of claim 1, wherein the second means increases the reaction force by a second force magnitude smaller than the first force magnitude.

5. The apparatus of claim 1, further comprising:
   a lock-up clutch;
   wherein the first operational state comprises an engaged state of the lock-up clutch, and wherein the second operational state comprises a disengaged state of the lock-up clutch.

6. The apparatus of claim 1, further comprising:
   an automatic transmission;
   wherein the first operational state comprises a state in which a gear ratio of the automatic transmission is higher than a predetermined gear ratio, and
   wherein the second operational state comprises a state in which the speed range of the automatic transmission is equal to or lower than the predetermined gear ratio.

7. The apparatus of claim 1, wherein the predetermined time period begins at a time associated with at least one of:
   when the first means increases the reaction force by the first force magnitude;
   when the first means decreases the reaction force by the first force magnitude; and
   when the vehicle transitions from the first operational state to the second operational state.

8. The apparatus of claim 1, wherein the accelerator mechanism comprises a accelerator pedal.

9. An apparatus to control a reaction force of an accelerator of a vehicle, the control apparatus comprising:
   a detector configured to detect an opening degree of the accelerator based on a magnitude at which the accelerator is operated; and
   a controller configured to increase the reaction force by a first force magnitude during a period in which the vehicle transitions from a first operational state to a second operational state in response to an increase in the opening degree of the accelerator; and
   wherein the controller is further configured to increase the reaction force if the accelerator opening degree is increased within a predetermined time period after the reaction force is increased by the first force magnitude;
   wherein the first operational state corresponds to a low specific fuel consumption and the second operational state corresponds to a high specific fuel consumption, and
   wherein the controller is further configured to decrease the reaction force by the first force magnitude in response to a reduction in the opening degree of the accelerator.

10. The apparatus of claim 9, wherein, the controller is configured to increase the reaction force when the opening degree of the accelerator is increased after the controller decreases the reaction force by the first force magnitude.

11. The apparatus of claim 9, wherein:
   the controller is configured to increase the reaction force when the opening degree of the accelerator exceeds a first determination threshold set in accordance with the transition period;
   the controller is configured to increase the reaction force when the opening degree of the accelerator exceeds a second determination threshold; and
   wherein the second determination threshold is smaller than the first determination threshold.

12. The apparatus of claim 9, wherein the controller is configured to increase the reaction force by a second force magnitude smaller than the first force magnitude.

13. The apparatus of claim 9, further comprising:
   a lock-up clutch;
   wherein the first operational state comprises an engaged state of the lock-up clutch, and wherein the second operational state comprises a disengaged state of the lock-up clutch.

14. The apparatus of claim 9, further comprising:
an automatic transmission;
wherein the first operational state comprises a state in which a gear ratio of the automatic transmission is higher than a predetermined gear ratio, and
wherein the second operational state comprises a state in which the speed range of the automatic transmission is equal to or lower than the predetermined gear ratio.

15. The apparatus of claim 9, wherein the predetermined time period begins at a time associated with at least one of:
when the controller increases the reaction force by the first force magnitude;
when the controller decreases the reaction force by the first force magnitude; and
when the vehicle transitions from the first operational state to the second operational state.

16. The apparatus of claim 9, wherein the accelerator mechanism comprises a accelerator pedal.

17. A method to control a reaction force of an accelerator of a vehicle, the control apparatus comprising:
detecting an opening degree of the accelerator based on a magnitude at which the accelerator is operated;
increasing the reaction force by a first force magnitude during a period in which the vehicle transitions from a first operational state to a second operational state in response to an increase in the opening degree of the accelerator;
decreasing the reaction force by the first force magnitude in response to a reduction in the opening degree of the accelerator;
increasing the reaction force if the accelerator opening degree is increased within a predetermined time period after the reaction force is increased by the first force magnitude;
corresponding the first operational state to a low specific fuel consumption; and
corresponding the second operational state to a specific fuel consumption higher than the low specific fuel consumption.

18. The method of claim 17, further comprising increasing the reaction force when the opening degree of the accelerator is increased after the reaction force is decreased by the first force magnitude.

19. The apparatus of claim 17, further comprising:
increasing the reaction force when the opening degree of the accelerator exceeds a first determination threshold set in accordance with the transition period; and
increasing the reaction force when the opening degree of the accelerator exceeds a second determination threshold;
wherein the second determination threshold is smaller than the first determination threshold.

20. The apparatus of claim 17, further comprising increasing the reaction force by a second force magnitude smaller than the first force magnitude.

\* \* \* \* \*